United States Patent [19]

Thompson, Jr.

[11] 4,213,600

[45] Jul. 22, 1980

[54] SILVER RECLAMATION APPARATUS

[76] Inventor: Roy R. Thompson, Jr., 6520 N. Haven Rd., Dallas, Tex. 75230

[21] Appl. No.: 931,317

[22] Filed: Aug. 7, 1978

[51] Int. Cl.$^2$ ............................................. C22B 11/12
[52] U.S. Cl. .................................. 266/170; 210/266; 210/283; 75/118 P
[58] Field of Search ................. 210/266, 283, 282, 50, 210/63 R, 42 R, 290, 264; 75/118 P, 117; 266/170

[56] References Cited

U.S. PATENT DOCUMENTS

| | | | |
|---|---|---|---|
| 3,630,505 | 12/1971 | Mackay | 75/118 P |
| 3,655,175 | 4/1972 | Zeleny et al. | 266/170 |
| 3,660,079 | 5/1972 | Govani | 75/118 P |
| 3,792,845 | 2/1974 | Larson et al. | 266/170 |
| 3,840,217 | 10/1974 | Mackay | 266/170 |
| 4,096,064 | 6/1978 | du Fresne | 210/50 |

FOREIGN PATENT DOCUMENTS 215832  11/1957  Australia ................................ 75/118 P

*Primary Examiner*—Benoît Castel
*Attorney, Agent, or Firm*—Hubbard, Thurman, Turner, Tucker & Glaser

[57] ABSTRACT

Apparatus for recovering silver from spent photographic processing solutions is disclosed. The silver recovery apparatus includes a cylindrical container in which a plurality of fluid permeable layers of a chemical reduction agent are disposed in interleaved relation with a plurality of fluid permeable layers of a non-reactive filter material. The interleaved combination of the layers defines a fluid permeable flow path through the container. The chemical reduction agent in each reduction layer comprises a metal which is electropositive with respect to silver. In a preferred embodiment, the chemical reduction agent disposed in an adjacent pair of reduction layers comprises first and second metals occupying relatively different positions in the electromotive series, respectively, thereby producing a galvanic effect which enhances the precipitation of silver.

4 Claims, 4 Drawing Figures

SILVER RECLAMATION APPARATUS

BACKGROUND OF THE INVENTION

1. Field of the Invention

The present invention relates generally to apparatus for collecting precipitation from a solvent solution and in particular to apparatus for recovering silver from spent photographic processing solutions.

2. Description of the Prior Art

Silver recovery from spent photographic processing solutions represents a significant means for conserving silver as a natural resource. An equally important consideration is that heavy metals such as silver and other compounds typically found in spent photographic solutions should not be discharged into municipal storm sewers or sewage systems because of the general toxic effect on the ecology and interference with operation of the sewage system and because of the danger of contaminating the local aquifer. Furthermore, because silver is an important industrial metal, and because it is relatively scarce, the recovery of silver from spent photographic processing solutions represents significant source of revenue for industrial users of photographic products.

Because of the intrinsic value of silver, there has been considerable interest down through the years in providing apparatus for recovering the silver values from photographic solutions. Such apparatus typically includes a metal deposit in the solution flow path which is higher than silver in the electromotive series, and the silver is deposited on this metal as the metal replaces silver in the solution as a result of a chemical reduction reaction. The prior art teaches the use of steel or copper wool, metal turnings, wire, chips and the like interposed in the flow path of the solution. The complex silver salts formed during film processing yield the silver on contact with the metal which is above silver in the electromotive series, thereby causing that metal to go into solution in place of the silver ions, which become deposited on the remaining metal as zero valence silver.

Such conventional silver recovery units have been generally satisfactory as far as the economy of relatively low volume operations is concerned. However, elaborate multi-stage arrangements of prior art recovery devices have been required to remove enough silver from the photographic solutions to meet the various standards established by governmental agencies concerning the maximum amount of a heavy metal such as silver, in parts per million, which is permissible in effluent discharge into a water course or sewage system. Additionally, in large scale recovery operations, the flow rate of photographic solution through recovery devices is a limiting factor in regeneration or rejuvenation processes as well as being a limiting factor in the silver recovery process. Therefore there is a continuing interest in improving the basic silver recovery procedure to make it more effective and efficient.

SUMMARY OF THE INVENTION

It is, therefore, an object of the present invention to provide silver recovery apparatus which separates silver from solution more rapidly than conventional recovery apparatus.

Another important object of the present invention is to provide an improved silver recovery apparatus which is also effective for inducing the precipitation and recovery of precipitation products other than silver, such as sulfur compounds commonly found in spent photographic solutions, for which it is desirable to limit the amount discharged into surface water ways and sewage systems.

Another important object of the present invention is to provide apparatus for inducing the precipitation of products from a solution containing dissolved chemical element ion compounds and for collecting the precipitation products in a fluid permeable filter medium which is substantially non-reactive to the ionic solution.

The foregoing and other objects are provided by the present invention which features a container in which a plurality of fluid permeable layers of a chemical reduction agent are disposed in interleaved relation with a plurality of fluid permeable layers of a non-reactive filer material. The interleaved combination of layers define a fluid permeable flow path through which a solvent solution of silver flows. Th chemical reduction agent comprises a metal which is electropositive with respect to silver so that reduction of the silver ions occur yielding a precipitation product of zero valence silver which is accumulated in the layer of non-reactive filter material. In a preferred embodiment the chemical reduction agent is finely divided zinc and the non-reactive filter material is a pad of glass fibers.

It has been observed that the provision of the alternating layers of a chemical reduction agent and the non-reactive filter medium enhances the reduction of the silver ion to metallic silver in response to the replacement of silver ions in the solution by the chemical reduction agent. It has also been observed that the precipitation process proceeds more rapidly with a greater percentage of the silver ions being precipitated and recovered where the exchange is induced in a zone or layer containing the chemical reduction agent with the precipitation product being recovered or accumulated in a zone or layer which is physically separated with respect to the reduction layer.

It has also been observed that the precipitation process is accelerated in the interleaved reduction and filter layers as discussed above where the chemical reduction agent in alternate layers comprise first and second metals which occupy relatively different positions in the electromotive series, respectively. The presence of the different metals, one being electropositive with respect to the other, in combination with the ionic solution, produces a galvanic cell effect which accelerates the precipitation of silver and other precipitation products such as sulfur compounds.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawing.

DESCRIPTION OF THE PREFERRED EMBODIMENTS

Figure 1:
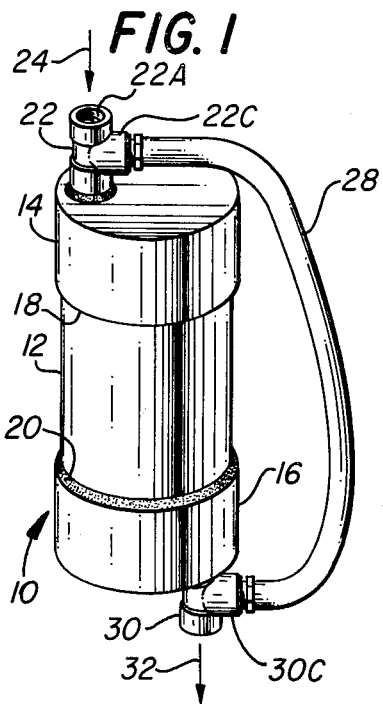
FIG. 1 is a perspective view of a silver recovery unit constructed according to the teachings of the present invention.

In the description which follows, like parts are marked throughout the specification and drawing with the same reference numerals respectively. The drawings are not necessarily to scale and in some instances portion have been exaggerated in order to more clearly depict certain features of the invention.

Referring now to the drawing, and in particulr to FIG. 1, a silver recovery unit 10 constructed according to the teachings of the invention is shown. The silver recovery unit 10 includes a cylindrical housing 12 which is sealed by an upper cap 14 and a lower cap 16 which in combination define a container or vessel in which the component parts of the recovery unit are housed. The cylindrical housing 12 and caps 14, 16 preferably comprise polyethylene or other suitable chemically inert plastic material which will render the assembly reusable. Although the preferred housing structure is cylindrical as shown in FIG. 1, other arrangements such as a box-like form which is rectangular in horizontal and vertical cross-section may be used to good advantage. The housing assembly can be constructed of any suitable material can be of any size or shape that is practical for the particular use contemplated. If desired, at least one of the caps may be integrally formed with the cylindrical housing 12 in a structure which may be formed, for example, by vacuum molding techniques. However, it is important that at least one of the caps, either the upper cap 14 or the lower cap 16 be removable from the cylindrical housing 12 to permit the filter components to be inserted and withdrawn. In the present embodiment, both the upper and lower caps 14, 16 are removable and are joined in a fluid-tight union with the cylindrical housing 12 by means of adhesive deposits 18, 20 (FIG. 2), respectively.

Photographic processing solution is introducd into the silver recovery unit 10 through an inlet port assembly 22 which projects from the cap 14. The inlet port assembly 22 preferably comprises a threaded tee conduit section having an inlet opening 22A for receiving the flow of photographic solution as indicated by the arrow 24, an outlet opening 22B connected in fluid communication with the interior chamber 26 of the silver recovery unit, and a by-pass connection 22C which is coupled to a by-pass conduit 28 for diverting the flow of photographic solution when the filter elements of the silver recovery unit 10 become saturated and block the flow of processing fluid. The by-pass conduit 28 is preferably formed of a length of clear plastic tubing to provide a visual indication of an overflow condition. The opposite end of the by-pass conduit 28 is coupled to an outlet port assembly 30 through which effluent processing solution is discharged as indicated by the arrow 32. The outlet port assembly 30 is identical in construction to the inlet port assembly 22 and includes a discharge opening 30A, inlet opening 30B connected in fluid communication with the interior chamber 26 and a by-pass coupling 30C which is connected to the overflow by-pass conduit 28.

Figure 2:
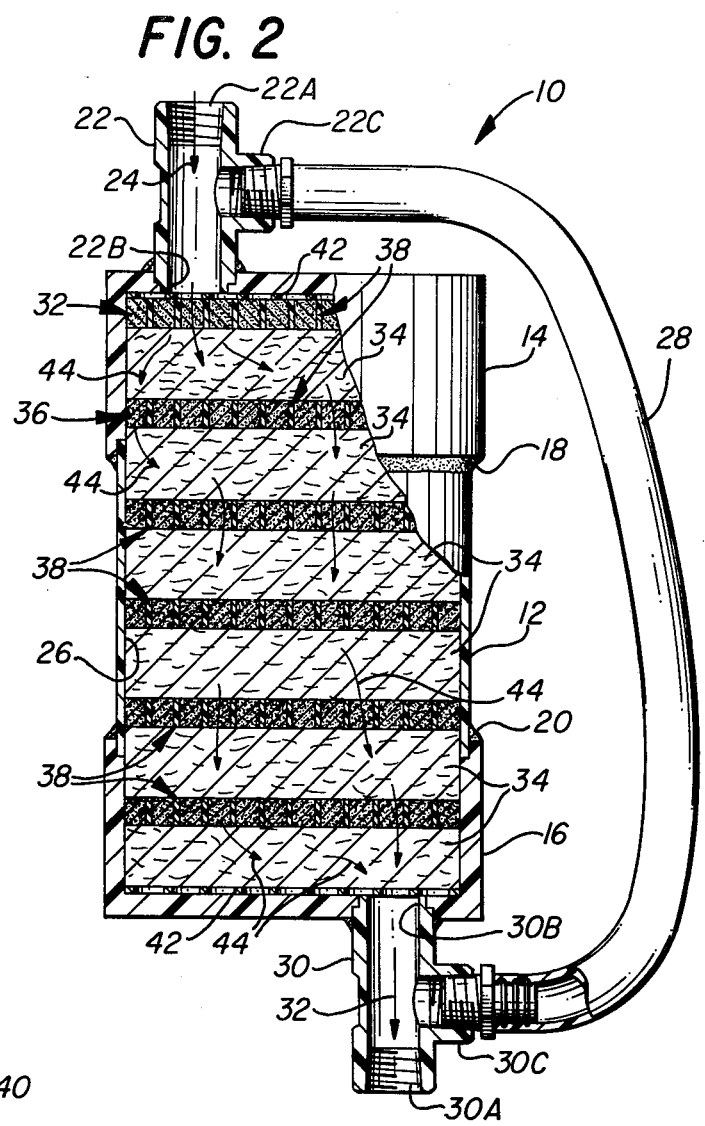
FIG. 2 is a side elevation view, partly in section, of the silver recovery unit shown in FIG. 1.
Figure 3:
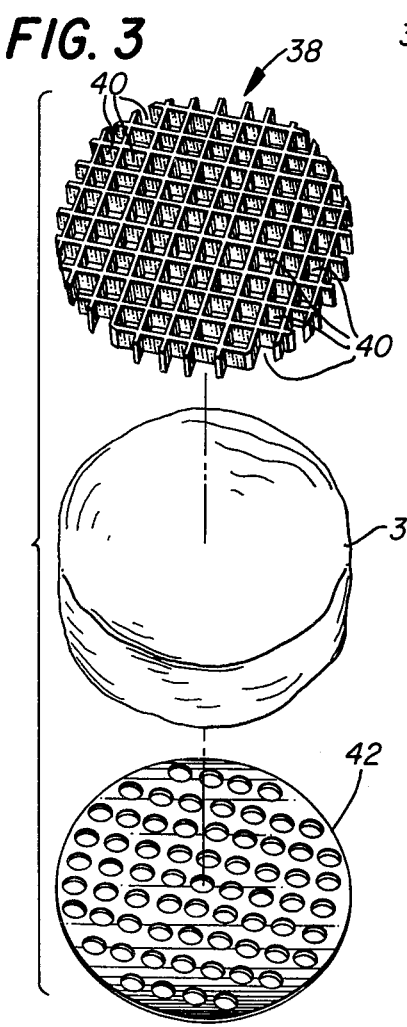
FIG. 3 is an exploded perspective view of a partitioning assembly which is contained within the silver recovery unit shown in FIG. 2.
Figure 4:
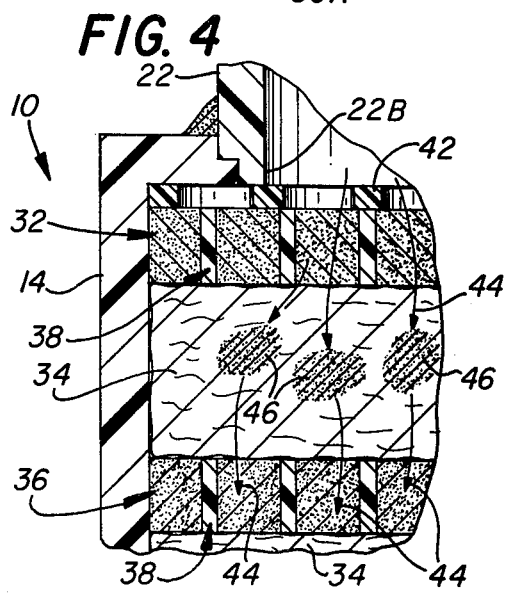
FIG. 4 is an enlarged sectional view of a portion of the silver recovery apparatus shown in FIG. 2.

Referring now to FIGS. 2, 3 and 4, the principal interior components of the silver recovery unit 10 comprise fluid permeable layers 32 of a chemical reduction agent disposed in interleaved relation with fluid permeable layer 34 of a non-reactive filter material. According to an important embodiment of the invention, the chemical reduction agent in each reduction layer comprises a metal which is electropositive with respect to silver, and the chemical reduction agent dispose in adjacent pairs of reduction layer comprising first and second metals which occupy relatively different positions in the electromotive series, respectively, thereby producing a galvanic effect which enhances the precipitation of silver products. As can best be seen in FIG. 2, the interleaved combination of chemical reduction agent layers and non-reactive filter material layers are provided by a first chemical reduction agent layer 32 followed by a fluid permeable layer of a non-reactive filter materal 34 which is in turn followed by a second chemical reduction layer 36. This physical arrangement in which reduction layers alternate with non-reactive filter material layers is repeated throughout the interior chamber 26.

The interior chamber 26 is partitioned to form the various layers by the engagement of a grid array 38 of open cells 40 against a pad 34 or disc of the non-reactive filter material. The interleaved layers are enclosed at the top and bottom by means of a perforated spacer 42 which permits drainage of the photographic solution into and out of the interleaved layers and which prevents infiltration of the filter material into the inlet and outlet port assemblies 22, 30.

According to one important embodiment of the invention, the chemical reduction agent forming the first chemical reduction layer 32 is finely divided copper particles or copper dust which is deposited in the open cells 40 of the grid array 38. In this arrangement it is preferred that the second chemical reduction layer 36 comprise finely divided particles of zinc or zinc dust deposited in the open cells 40 of a grid array 38. Various combinations of copper and zinc and may be utilized for the different chemical reduction layers of the assembly. In its broadest aspects, the invention resides in the provision of alternating layers of a chemical reduction agent which is electropositive with respect to the element or compound which is to be precipitated and collected in interleaved relation with layers of a non-reactive filter material which accumulates the precipitation products so that the inducement of the precipitation products and the accumulation of precipitation products occur in separate zones throughout the interior chamber 26.

One preferred arrangement is the provision of zinc powder as the chemical reduction agent in each of the reduction layers. On the other hand some other element such as aluminum or magnesium which occupies a higher position relative to silver in the electromotive force series may be used to good advantage. It has been observed that the provision of the alternating layers of a chemical reduction agent with the non-reactive filter medium layers enhances the reduction of the silver ion to metallic silver in response to the replacement of silver ions in the solution by the chemical reduction agent. It has also been observed that the precipitation process proceeds more rapidly with a greater percentage of the silver ions being precipitated and recovered where the exchange is induced in a zone or layer containing the chemical reduction agent with the precipitation product being recovered or accumulated in a zone or layer which is physically separated with respect to the reduction layer.

It has also been observed that the precipitation process is accelerated in the interleaved reduction and filter layers as discussed above where the chemical reduction agent in alternate layers comprise first and second metals which occupy relatively different positions in the electromotive series, respectively. Although the reasons for this phenomenon are not fully understood, it is believed that the presence of the different reduction agents, one being electropositive with respect to the other, in combination with the ionic solution which passes through the recovery unit, produces a galvanic cell effect which accelerates the precipitation of silver and other precipitation products such as sulfur compounds. Therefore an important embodiment of the invention is the provision of a first chemical reduction agent such as copper in the first chemical reduction layer 32 and the provision of a second chemical reduction agent such as zinc in the second chemical reduction layer 36. The reduction agents, copper and zinc, serve not only to replace the silver ions in the photographic solution but also serve in combination with the photographic solution to form a galvanic cell which accelerates or otherwise enhances the production of precipitation products.

The pad of non-reactive filter material 34 is preferably Fiberglass which is the trade name of Owens-Corning Fiberglass Company for glass fibers made in diameters from 0.002 to 0.008 inch (0.005 to 0.2 millimeter). However, other fibrous material, for example synthetic resins, which do not react significantly with the photographic solution, may be used to good advantage. It is important, however, that the filter material 34 be fluid permeable and have a large ratio of exposed surface area to mass.

Referring now to FIGS. 2 and 4, the interleaved combination of reduction layers and non-reactive filter layers define a fluid permeable flow path as indicated by the arrows 44 which connects the inlet port assembly 22 in fluid communication with the outlet port assembly 30. As a liquid solution containing dissolved silver ions flows along the flow path as indicated by the arrows 44, the silver ions undergo chemical reduction as they contact the finely divided particles of zinc or copper in the various chemical reduction layers. Zero valence silver is produced by this reduction process and precipitates from the solution and is accumulated or collected in silver precipitation regions 46 within the non-reactive filter pad 34 as shown in FIG. 4. After the filter pads 34 have become saturated, they are withdrawn from the recovery unit 10 and then allowed to dry. The saturated filter is then melted in the crucible of a furnace by using known fluxes (borax, glass dust, etc.) which yields ingots of silver assaying 98% fine or better.

An unexpected benefit provided by the apparatus of the invention is its ability to remove precipitation products other than silver, such as zinc sulfate, from the photographic solution. According to recent tests, for a photographic solution having 240 ppm of sulfur and sulfides, less than 1 ppm of sulfur or sulfides were detected in the output of the silver recovery unit 10. For a silver ion concentration of 360 ppm on the input, the silver recovery unit 10 had an output of less than 1 ppb of silver ions.

Although preferred embodiments of the invention have been described in detail, it should be understood that various changes, substitutions and alterations can be made therein without departing from the spirit and scope of the invention as defined by the appended claims.

What is claimed is:

1. Apparatus for recovering silver from a liquid solution containing dissolved silver compounds comprising, in combination:
   a vessel having an inlet port for receiving said liquid solution, a discharge port for removing effluent solution from said vessel, and an enclosure portion defining a flow path from said inlet port to said discharge port;
   means partitioning said flow path into adjoining flow path regions;
   a fluid permeable layer of metal and a fluid permeable layer of filter material disposed in alternate ones of said flow path regions, respectively, each metal layer consisting of a metal which is more electropositive than silver in the electromotive series, and each filter layer consisting of a chemically inert fibrous material which is substantially non-reactive to said liquid solution;
   said partitioning means defining first, second and third adjoining flow path regions, said fluid permeable layer of metal being disposed in each of said first and third flow path regions, and said fluid permeable layer of filter material being disposed in said second flow path region, the metal layers in said first and third regions consisting of first and second metals, respectively, each of said metals being electropositive with respect to silver, and each occupying relatively different positions in the electromotive series, respectively.

2. Silver recovery apparatus as defined in claim 1, said chemically inert fibrous material comprising glass.

3. Silver recovery apparatus as defined in claim 1, said first metal comprising copper and said second metal comprising zinc.

4. Silver recovery apparatus as defined in claim 1, said partitioning means comprising a grid array of cells and a perforated plate, said filter mateial being disposed intermediate said grid and said perforated plate, said fluid permeable layer of metal comprising a deposit of particles of said metal within the cells of said grid.

* * * * *